June 28, 1960 P. E. DOSTIE 2,942,816
PASSENGER EVACUATING DEVICE FOR AIRPLANES IN FLIGHT
Filed Oct. 23, 1958 3 Sheets-Sheet 1
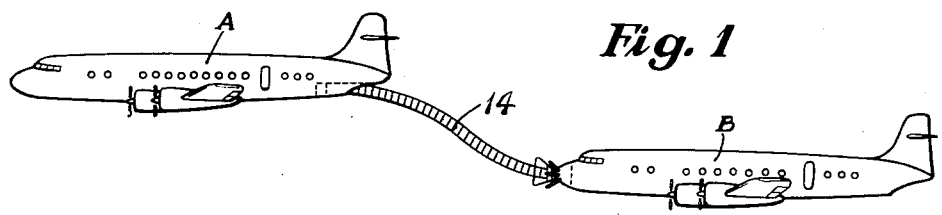
Fig. 1
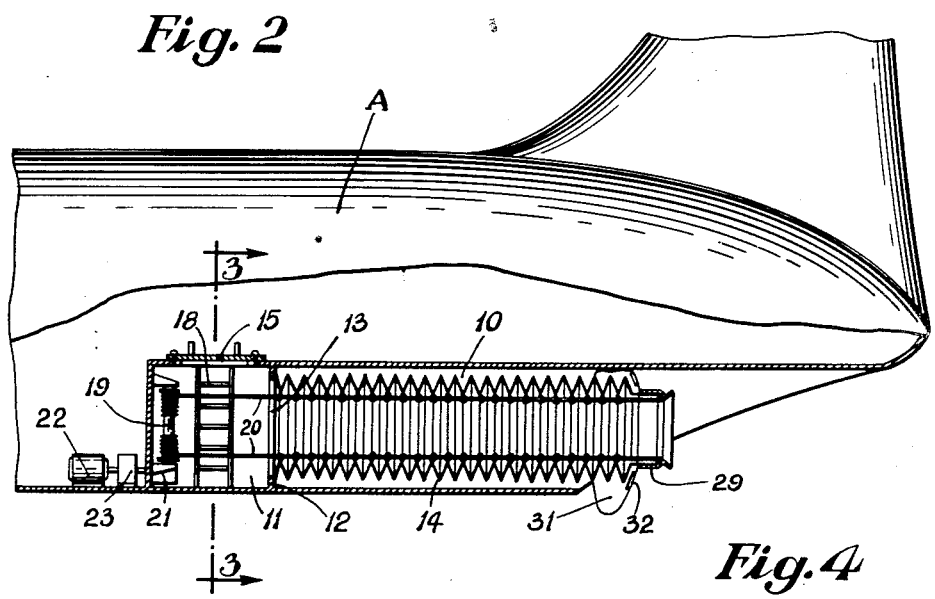
Fig. 2
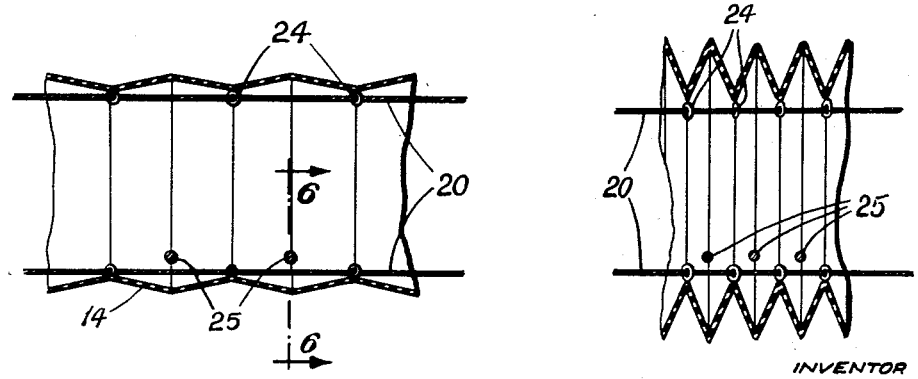
Fig. 4
Fig. 5
INVENTOR
Paul E. DOSTIE
BY
ATTORNEYS June 28, 1960 P. E. DOSTIE 2,942,816
PASSENGER EVACUATING DEVICE FOR AIRPLANES IN FLIGHT
Filed Oct. 23, 1958 3 Sheets-Sheet 2

INVENTOR
Paul E. DOSTIE
BY
ATTORNEYS

June 28, 1960 P. E. DOSTIE 2,942,816
PASSENGER EVACUATING DEVICE FOR AIRPLANES IN FLIGHT
Filed Oct. 23, 1958 3 Sheets-Sheet 3

INVENTOR
Paul E. DOSTIE
BY
ATTORNEYS

United States Patent Office 2,942,816
Patented June 28, 1960

2,942,816

PASSENGER EVACUATING DEVICE FOR AIRPLANES IN FLIGHT

Paul Emile Dostie, 630 Kleber, Duvernay, Quebec, Canada

Filed Oct. 23, 1958, Ser. No. 769,175

4 Claims. (Cl. 244—137)

The present invention relates to a device for transferring passengers and possibly other materials from one airplane to another, while both airplanes are flying behind one another at about the same speed.

Such a device is of particular use, when, as it often happens, the pilot of a plane foresees landing trouble, for one reason or another, and wishes to ensure the safety of his passengers. By means of the device in accordance with the present invention, the passengers of the crippled plane can comfortably and rapidly be transferred to another plane. It will be seen that the invention is particularly, though not exclusively, suitable for commercial airliners.

The device in accordance with the present invention consists necessarily of two parts, namely one part attached to the plane from which is desired to evacuate passengers, and another part attached to the plane receiving the passengers.

The invention comprises essentially an extensible tube, preferably of bellows construction, which is attached to the tail of the plane from which passengers are to be evacuated, and fastening means on the nose of the plane receiving the passengers, for securing the end of the tube. The invention further provides a housing for the tube, when the same is in retracted position, a winch and cable device for retracting the tube, and means for pressurizing the interior of the tube to obtain therein the same pressure as in the cabins of the aircrafts.

Further features of the invention will become apparent from the following description of one embodiment thereof, in conjunction with the accompanying drawings, in which:

Figure 1 is a general view of two planes with the evacuating device connected therebetween;

Figure 2 is a partial vertical section of the airplane from which the passengers can be evacuated, showing the extensible tube in retracted position;

Figure 4 is an enlarged longitudinal section of a portion of the tube in retracted position;

Figure 5 is a section corresponding to Figure 4, but showing the tube in extended position;

Reference will now be made to the drawings, in which like characters indicate like elements throughout.

Figure 6:
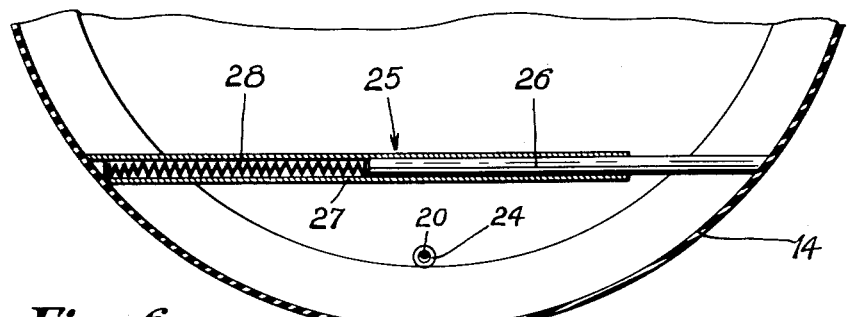
Figure 6 is a cross section of the tube taken on line 6—6 of Figure 5, and showing in section one of the rungs inside the tube.

The plane from which the passengers may be evacuated, indicated at A, comprises at its tail end a housing 10 and a chamber 11. A partition 12 separates housing 10 from chamber 11, and comprises a round window 13 (Figure 3) to the periphery of which is secured in air-tight relation the end of the extensible tube 14; said tube 14, in the retracted position shown in Figure 2, is contained for the most part within the housing 10.

Figure 3:
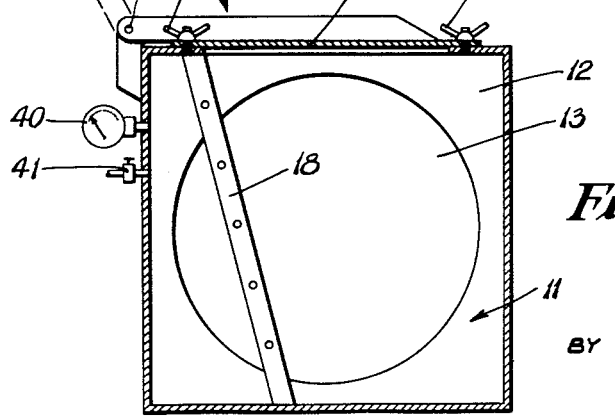
Figure 3 is a partial section on line 3—3 of Figure 2.

Chamber 11 communicates with the cabin of the airplane through a door 15, hinged at 16, and closed airtight by wing nuts 17 (Figure 3). An air tight gasket (not shown) is provided on the closing surface of door 15. A ladder Fig. 2 leads from the cabin into chamber 11.

A winch 19, located in chamber 11, receives cables 20 for retracting the tube 14 to its inoperative position. The winch 19 is operated through a differential gear 21, by a motor 22 and clutch 23 disposed in the cabin of the airplane.

The tube 14 (Figures 4 and 5) is of bellows construction, and is made of a resilient, deformable material. At the top and bottom portions of the inner folds of the tube 14, are provided rings 24 adapted to receive and guide the cables 20. To the outer folds of the tube are rigidly secured rungs 25, disposed horizontally. Each rung 25 (Figure 6) is formed of inner and outer telescopic members 26 and 27, and compression springs 28 contained in the outer telescopic member 27, to compensate for the deformation of the outer folds of tube 14, when the tube is extended and retracted.

The outer end portion of tube 14 (Figures 7 and 9) comprises a ring 29 having a groove 30 adjacent its rearmost end. Cables 20 are attached to ring 29. Four resilient, stabilizing inflatable, hollow webs 31 are secured to the end portion of tube 14 adjacent ring 29, and to a frustoconical ring 32, open at its rear as well as its forward end.

Figure 7:
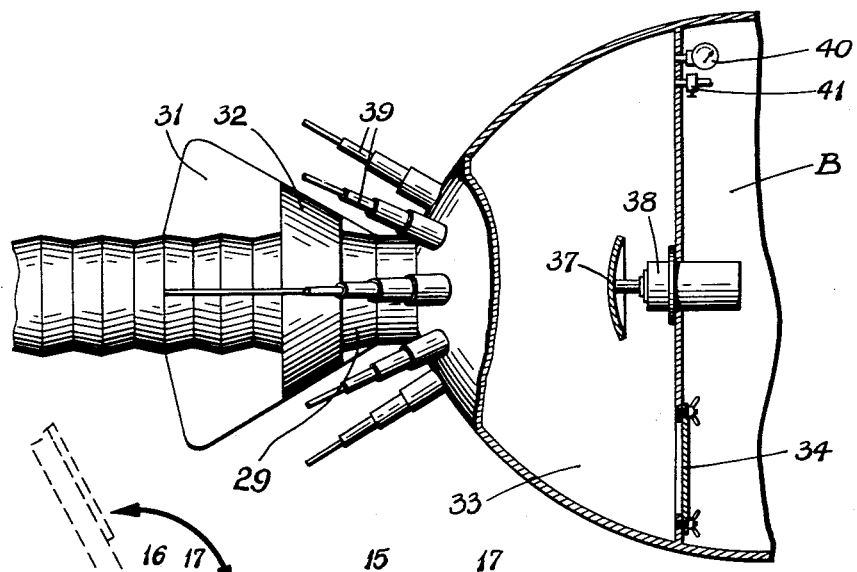
Figure 7 is an elevation of the outer end of the tube connected to the nose of the airplane receiving the passengers, a portion of said airplane being shown in section.
Figure 8:
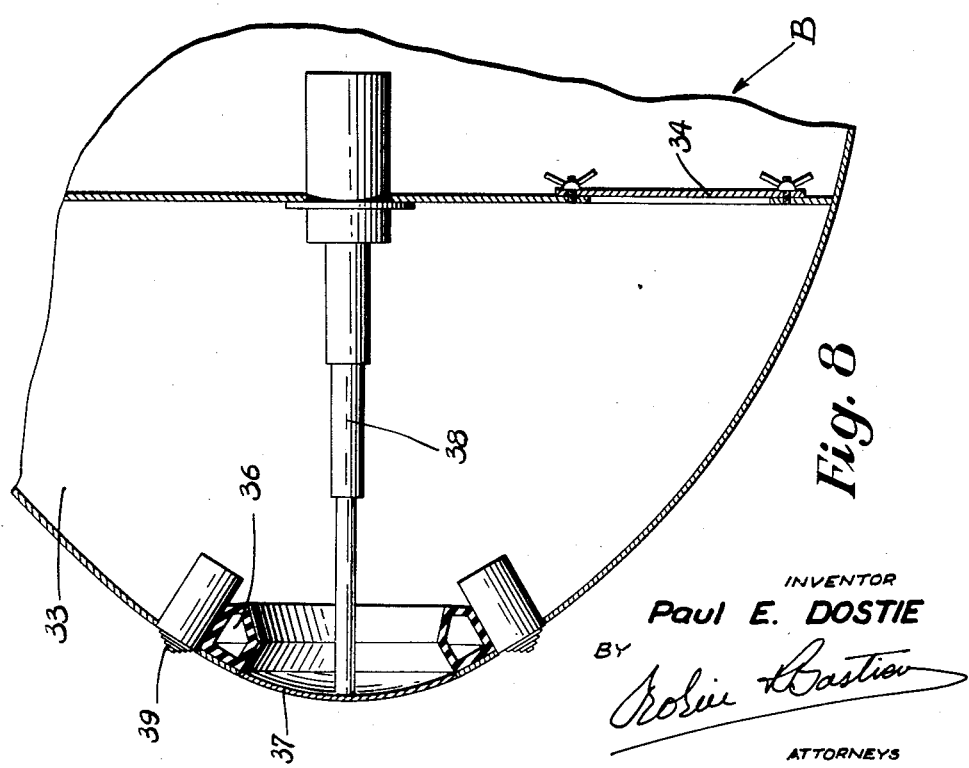
Figure 8 is a longitudinal section of the nose portion of the airplane receiving the passengers, with the nose portion closed, as during normal flight conditions.

The nose portion of the airplane B which receives the passengers (Figures 7, 8 and 9) comprises a chamber 33 communicating with the cabin of the airplane through an air tight door 34 of construction similar to door 15 of airplane A. The tip of the nose portion of airplane B comprises a round window 35 (Figure 9) surrounded by a hollow, inflatable packing ring 36. A door 37 mounted on a telescopic power unit 38, is adapted to close window 35 (Figure 8).

Eight telescopic guide rods 39 extend outwardly around the window 35. Rods 39 are fully retractable, as shown in Figure 8.

Each of chambers 11 and 33 comprises a manometer 40, indicating the pressure in the chamber and readable from the cabin of the respective airplane, and an air gate valve 41 operable from inside the cabin, and placing the respective chamber in communication with the cabin of the aircraft.

The operation of the device is as follows:

During normal operation of the airplanes, doors 15 and 34 are shut, valves 41 are closed, and the door 37 is in the position of Figure 8. Furthermore the clutch 23 is in engaged position, and which 19 is prevented from unrolling by the inertia of motor 22.

Figure 9:
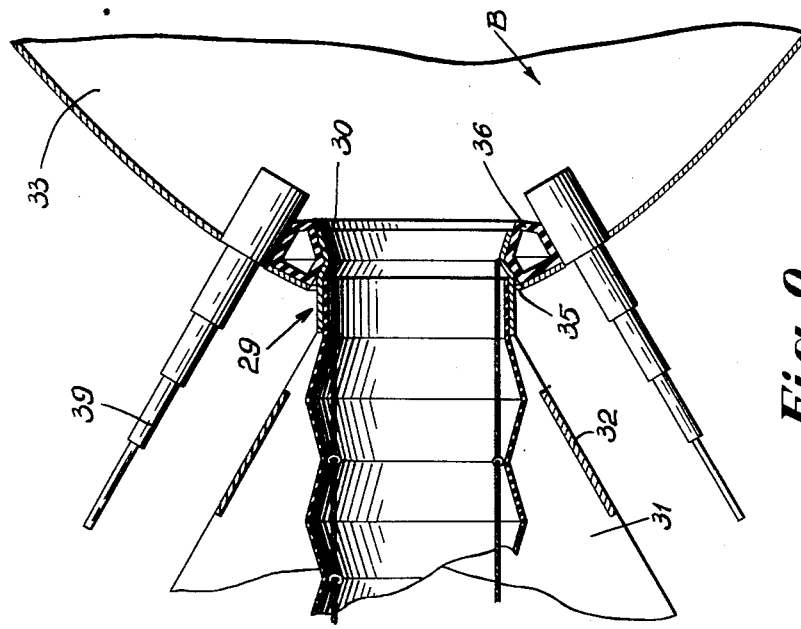
Figure 9 is a section corresponding to Figure 8, with the tube connected to the airplane as in Figure 7.

When it is desired to operate the evacuating device, the clutch 23 is first released. Thereupon the air flowing past aircraft A inflates webs 31 and engages ring 32, and pulls tube 14 to its fully extended position. At the same time in airplane B the ring 36 is deflated and the power unit 38 is operated to pull back the door 37 to the position shown in Figure 7, while rods 39 are pushed out (Figures 7 and 9).

Thereafter planes A and B are maneuvered until ring 29 enters the window 35. To a certain extent, this is facilitated through contact of ring 32 with guide rods 39. Thereafter ring 36 is inflated and it thus engages groove 30 thereby securely holding ring 29 and providing an air tight joint around it.

At this stage chambers 11 and 33 and tube 14 define a space not communicating with the atmosphere. Both valves 41 are then opened, until the manometers 40 indicate that the pressure in the chambers and in the tube is the same as that in the cabins of the two airplanes.

Thereafter doors 15 and 34 are opened and the passengers can climb down ladder 18, and down the rungs 25, into chamber 33 and into the cabin of airplane B.

When the evacuation is over, doors 15 and 34 and valves 41 are closed, ring 36 is deflated, clutch 23 is engaged, motor 22 operates winch 19 to roll up cables 20 and retract tube 14 into housing 10, the power unit 33 moves door 37 to closed position, and ring 36 is re-inflated to provide an airtight joint around door 37, while guide rods 39 are retracted. Thus the original conditions are re-established.

It will be seen from the foregoing description that the device according to the invention is simple in construction, and is easy and safe to operate, and fulfils a need long felt in the field of commercial aviation, by relatively inexpensive means.

It is possible to provide on the same airplane the two parts of the evacuating device according to the invention, whereby an airplane so equipped may evacuate its passengers, and if required, act as the receiving airplane.

While a preferred embodiment of the invention is illustrated and described, various modifications are possible within the spirit and scope of the appended claims.

I claim:

1. A device for transferring passengers during flight from a first to a second airplane, both said airplanes having pressurized cabins, comprising a first chamber at the tail section of said first airplane, an air-tight door between said first chamber and the cabin of said first airplane, an extensible tube in communication with said first chamber and fastened thereto in air-tight relation, a second chamber at the nose of said second airplane, an air-tight door between said second chamber and the cabin of said second airplane, said second chamber having an opening at the nose of said second airplane, said opening adapted to receive the free end of said tube, fastening means for the free end of said tube, said fastening means providing an air-tight joint around said end of said tube, and releasing and retracting means for said tube.

2. A device as claimed in claim 1, wherein said fastening means comprises a hollow inflatable ring at the inner margin of said opening, the free end of said tube comprising a rigid ring with an annular groove engageable by said inflatable ring.

3. A device as claimed in claim 1, wherein said two chambers comprise air valves communicating with the cabins of the respective airplanes, and means for indicating the pressure in said chambers, readable from the interior of said cabins.

4. A device according to claim 1, further comprising a door for closing said opening.

References Cited in the file of this patent

UNITED STATES PATENTS

| | | |
|---|---|---|
| 1,070,639 | Topper | Aug. 19, 1913 |
| 2,692,103 | Cobham et al. | Oct. 19, 1954 |
| 2,823,881 | Patterson | Feb. 18, 1958 |

FOREIGN PATENTS

| | | |
|---|---|---|
| 468,604 | France | July 10, 1914 |